(12) United States Patent
James et al.

(10) Patent No.: US 12,412,435 B2
(45) Date of Patent: Sep. 9, 2025

(54) METHODS AND APPARATUS FOR INDICATIONS IN AUTOMATED VEHICLE HOLD SYSTEMS

(71) Applicant: Ford Global Technologies, LLC, Dearborn, MI (US)

(72) Inventors: Alex James, Ypsilanti, MI (US); Donald A. Perlick, Farmington Hills, MI (US); Bang Kim Cao, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 481 days.

(21) Appl. No.: 17/888,307

(22) Filed: Aug. 15, 2022

(65) Prior Publication Data

US 2024/0054827 A1 Feb. 15, 2024

(51) Int. Cl.
*G07C 5/08* (2006.01)
*B60T 7/12* (2006.01)

(52) U.S. Cl.
CPC .............. *G07C 5/0825* (2013.01); *B60T 7/12* (2013.01); *G07C 5/0833* (2013.01)

(58) Field of Classification Search
CPC ....... G07C 5/0825; G07C 5/0833; B60T 7/12; B60T 17/22; B60T 2201/06
See application file for complete search history.

(56) References Cited

U.S. PATENT DOCUMENTS

| | | |
|---|---|---|
| 5,984,429 A | 11/1999 | Nell et al. |
| 7,401,872 B2 | 7/2008 | Kinder et al. |
| 10,137,869 B2 | 11/2018 | Korte et al. |
| 10,493,961 B2 | 12/2019 | Shiozawa et al. |
| 2004/0226768 A1* | 11/2004 | DeLuca ................ B60T 17/221 180/275 |
| 2006/0095194 A1* | 5/2006 | Arai ................ B60W 30/18018 701/96 |
| 2011/0238284 A1* | 9/2011 | Bollig ................ B60W 30/192 701/113 |
| 2021/0179174 A1* | 6/2021 | Shingai ................ B60T 17/221 |
| 2024/0025413 A1* | 1/2024 | Tsubaki ........... B60W 30/18018 |

FOREIGN PATENT DOCUMENTS

DE          10151846          5/2002

* cited by examiner

*Primary Examiner* — Ig T An
(74) *Attorney, Agent, or Firm* — Lorne Forsythe; Hanley, Flight & Zimmerman, LLC

(57) ABSTRACT

Methods and apparatus for indications in automated vehicle hold systems are disclosed. An example apparatus includes determining that the automated vehicle hold system is active. Based on the determination that the automated vehicle hold system is active, initiating a delay timer. Prior to the delay timer elapsing, providing, by executing instructions with at least one processor, a first indication corresponding to the auto hold not being engaged, and upon the delay timer elapsing, providing a second indication corresponding to the auto hold being engaged.

21 Claims, 10 Drawing Sheets

METHODS AND APPARATUS FOR INDICATIONS IN AUTOMATED VEHICLE HOLD SYSTEMS

FIELD OF THE DISCLOSURE

This disclosure relates generally to automated vehicle hold systems and, more particularly, to methods and apparatus for indications in automated vehicle hold systems.

BACKGROUND

Typically, braking systems necessitate a user of a vehicle to maintain pressure on the brake pedal in order to maintain the vehicle at a standstill or to bring the vehicle to a stop. In recent years, auto hold braking systems that can maintain a brake in a held position without significant effort from a driver have been implemented. In particular, these auto hold braking systems enable the vehicle to remain stopped after the driver has held a brake pedal for a requisite time, which can be advantageous, especially in heavy traffic.

BRIEF DESCRIPTION OF THE DRAWINGS

In general, the same reference numbers will be used throughout the drawing(s) and accompanying written description to refer to the same or like parts. The figures are not to scale.

Figure 1:
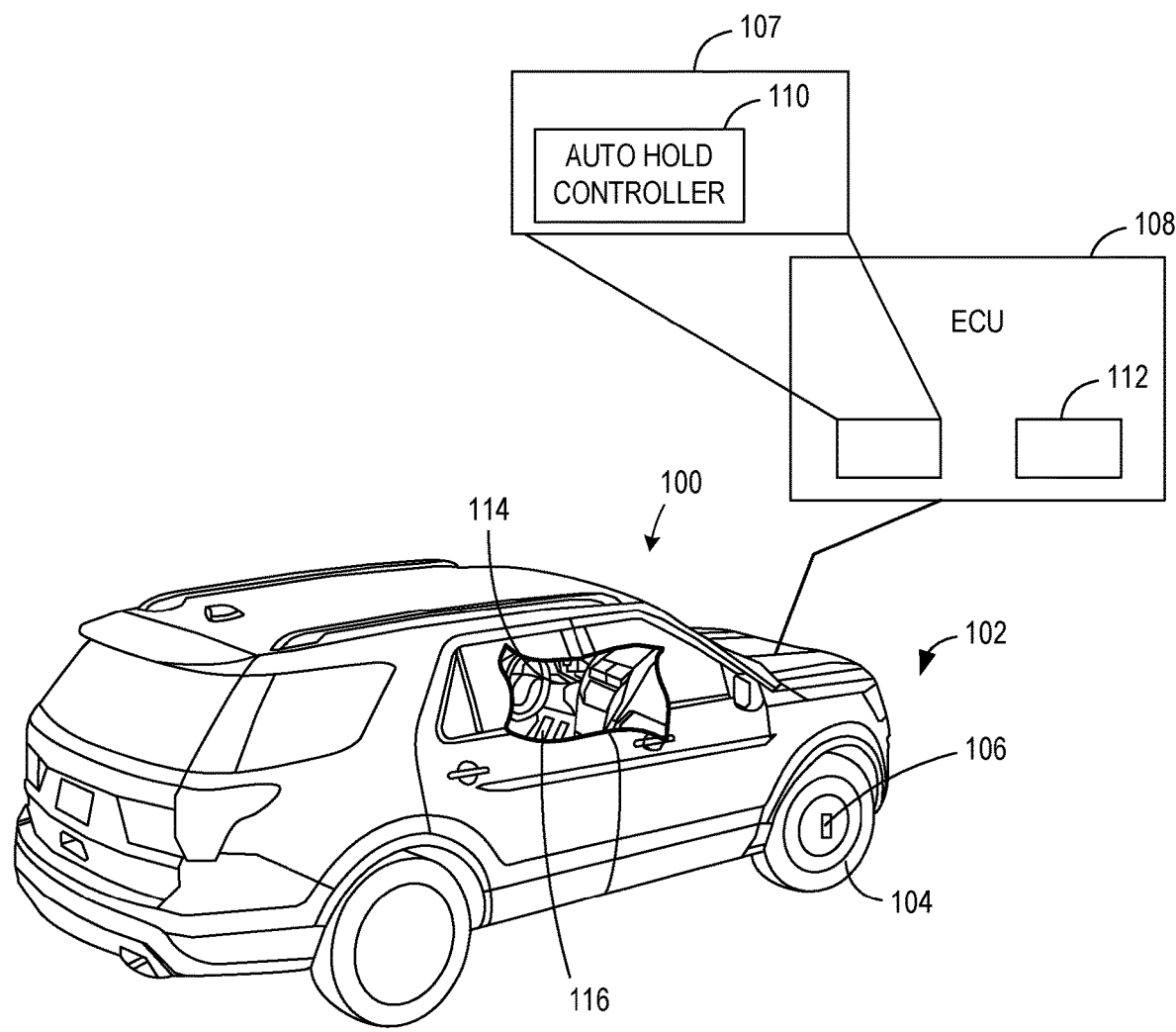
FIG. 1 depicts a vehicle in which examples disclosed herein can be implemented.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Methods and apparatus for indications in automated vehicle hold systems are disclosed. Automated vehicle hold or auto hold is a feature that can be utilized with a throttle control (e.g., a hill assist, speed control, etc.) or a vehicle brake system (e.g., brake holding), for example. In some known implementations, braking systems with auto hold systems enable braking pressure to be maintained in the brake lines of the vehicle after the driver of the vehicle ceases to press down on the brake pedal subsequent to pressing down the brake pedal for a requisite time delay (e.g., a default time delay value).

Examples disclosed herein can significantly increase awareness for a driver utilizing an automated vehicle hold system by indicating when the auto hold system is active (e.g., ready to engage) and whether the auto hold system is engaged or disengaged. Examples disclosed herein can clearly indicate to the driver that the auto hold system is not engaged during a time delay so that the driver is aware of when the auto hold system will subsequently engage. According to examples disclosed herein, the driver can customize parameters, such as the time delay and/or a requisite degree of pressure on a pedal to activate and/or engage the auto hold system, for example. Additionally or alternatively, conditions, such as traffic conditions (e.g., during stop and go traffic, roads or regions determined to have significant traffic via mapping/navigation services, etc.), location, driver accessibility settings, weather, etc. can be utilized to vary and/or control the time delay. In some examples, an auto hold system can be disabled in certain conditions and/or scenarios (e.g., while maneuvering a relatively large vehicle in a relatively tight space).

Examples disclosed herein implement an auto hold system in a vehicle. For example, the auto hold system (e.g., auto hold braking, auto hold throttling, etc.) determines that it is enabled (e.g., a brake pedal of the vehicle has been pressed, a switch or button on a dashboard has been toggled on, etc.) and, in turn, a time delay is initiated. Prior to the time delay ending, a first indication that the auto hold system is not engaged is displayed to the driver. Subsequently, when the time delay elapses, a second indication that indicates that auto hold is engaged is displayed to the driver. Additionally or alternatively, the time delay is customizable by the driver (e.g., via an infotainment system).

In some examples, the time delay is adjusted based on vehicle conditions, location, environment type, user preferences, accessibility settings, weather and/or physiological conditions/measurements of a driver. In some examples, the time delay is a user-selected customizable time delay (e.g., a 3 second time delay). In some examples, a duration of the time delay is set based on the amount of traffic that is on the roads (e.g., a duration of the time delay is shortened when traffic is heavy versus light). In some examples, a duration of the time delay is set based on the location of the vehicle (e.g., if the car is in a parking lot). In some examples, the time delay is set to zero (e.g., the auto hold system is always active).

As used herein, indicating that a system is "active" means that the system is ready to perform a function and/or action. As used herein, indicating that a system is "engaged" means that the system is performing or has performed the function and/or action.

FIG. 1 is a schematic illustration of an example vehicle 100 that can implement examples disclosed herein. The example vehicle 100 includes an example braking system 102 with an example brake 106, an example wheel 104, an example engine control unit (ECU) 108, and an example auto hold system 107 (e.g., an automated vehicle hold system) with an example auto hold controller 110. In this example, the ECU 108 includes and/or implements an example brake controller 112 and the auto hold system 107. The vehicle 100 of the illustrated example further includes an example dashboard 114, and an example brake pedal 116. The example vehicle 100 can be self-driving or not.

In the illustrated example of FIG. 1, the auto hold system 107 is implemented to maintain the vehicle 100 at a standstill by maintaining pressure in the brake lines when a driver of the vehicle 100 releases the brake pedal 116 after holding down and/or pressing the brake pedal 116 for at least a pre-defined time delay. In this example, the driver controls whether the auto hold system 107 is active or not (e.g., on or off) via a user interface (e.g., a button or a touchscreen delay). When active, the auto hold system 107 does not maintain the brakes 106 in a held position (without the driver holding down the brake pedal 116) until a time delay has elapsed.

In contrast to known systems, examples disclosed advantageously clearly indicate a status of whether an auto hold system 107 is engaged to a driver and/or a user of the vehicle 100. The auto hold system 107 may engage and hold a brake after a time delay. However, in other examples, the auto hold system 107 may be utilized to engage and/or maintain a throttle (or other vehicle system(s) and/or control(s)) after a time delay (e.g., to maintain the vehicle 100 or to remain stationary on an ascent or hill). In other words, examples disclosed herein can be implemented in any appropriate vehicle application that enables the driver and/or a user to customize the time delay to their preferences. Some examples disclosed herein display a timer or a graphical representation indicating when the auto hold system 107 is to be engaged.

Figure 2:
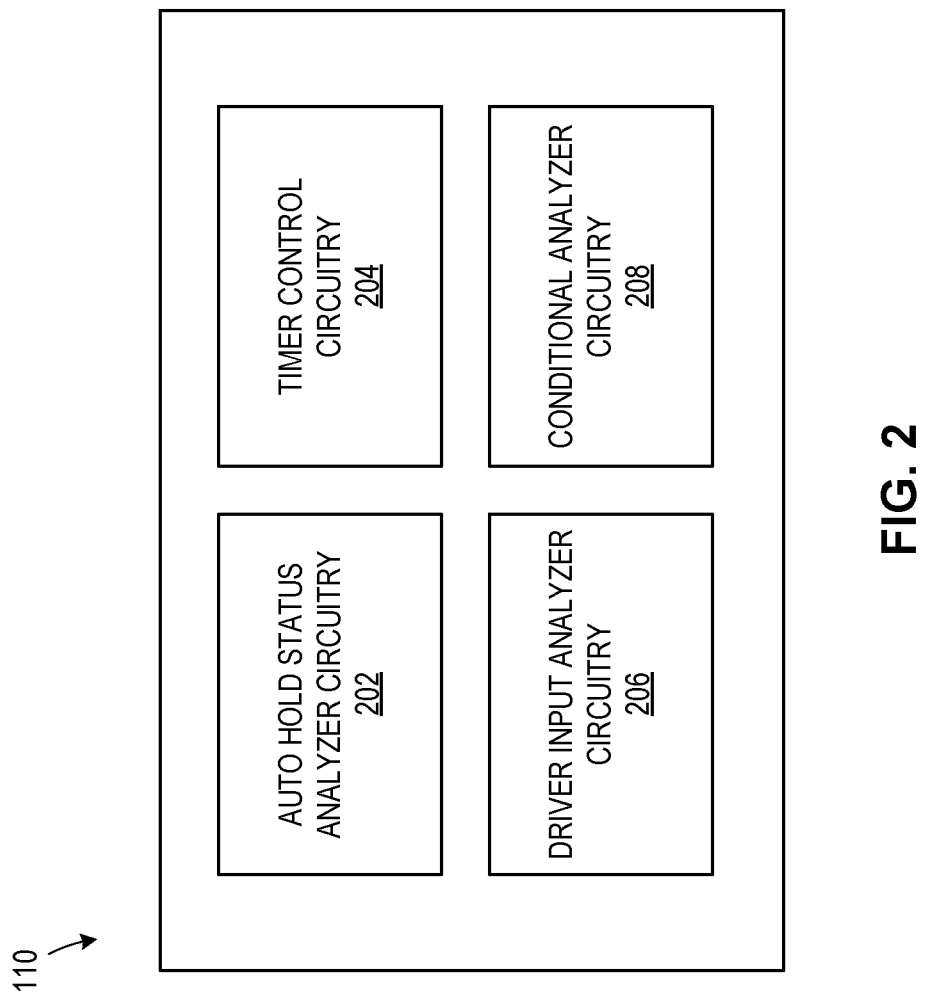
FIG. 2 is a block diagram of an example auto hold controller in accordance with teachings of this disclosure.

FIG. 2 is a block diagram of the example auto hold controller 110. In this example, the auto hold controller 110 indicates whether the aforementioned auto hold system 107 is engaged or not engaged (e.g., when the auto hold system is not engaged during a time delay) and enables a driver or user of the vehicle 100 to customize the time delay. The auto hold controller 110 of FIG. 2 may be instantiated (e.g., creating an instance of, bring into being for any length of time, materialize, implement, etc.) by processor circuitry such as a central processing unit executing instructions. Additionally or alternatively, the auto hold controller 110 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

According to the illustrated example, the auto hold controller 110 includes example auto hold status analyzer circuitry 202, example timer control circuitry 204, example driver input analyzer circuitry 206 and example condition analyzer circuitry 208. In this example, the auto hold controller 110 is communicatively coupled and/or implemented in the engine control unit 108 shown in FIG. 1.

The auto hold status analyzer circuitry 202 of the illustrated example is implemented to analyze and/or determine whether the auto hold system 107 is engaged or not engaged and, in particular, whether a first indication that indicates that the auto hold system 107 is not engaged is to be shown. In particular, the example auto hold status analyzer circuitry 202 utilizes an input associated with pressing of the brake pedal 116 and compares the input to a time delay and/or a threshold (e.g., a threshold time) to determine whether the time delay has elapsed. Prior to the time delay elapsing, the example auto hold status analyzer circuitry 202 causes the first indication to be displayed to the driver (e.g., via the dashboard 114). Additionally or alternatively, the example auto hold status analyzer circuitry 202 provides signals to the brake controller 112 to engage the auto hold system 107 in the vehicle 100 in the event that the time delay elapses. For example, when the time delay elapses, the example auto hold status analyzer circuitry 202 provides signals to the brake controller 112, thereby causing the auto hold system 107 of the vehicle 100 to engage and, thus, maintaining the vehicle 100 at a standstill.

Additionally or alternatively, the example auto hold status analyzer circuitry 202 analyzes and/or determines whether a second indication is to be provided to the driver, such that the second indication indicates that auto hold has been engaged. For example, when the time delay elapses, the example auto hold status analyzer circuitry 202 will provide, to the driver, the second indication indicating that the auto hold system 107 of vehicle 100 is engaged. Additionally or alternatively, the example auto hold status analyzer circuitry 202 analyzes and/or determines whether the first indication should be ceased from being displayed. For example, when the time delay elapses, the first indication (e.g., the indication alerting the driver or user that the auto hold system 107 is not engaged) will cease to be displayed/provided, thereby enabling the second indication to be displayed (e.g., via the example dashboard 114). In some examples, the auto hold status analyzer circuitry 202 is instantiated by processor circuitry executing auto hold status analyzer circuitry instructions and/or configured to perform operations such as those represented by the flowcharts of FIGS. 5 and 6.

The example timer control circuitry 204 is implemented to control and/or obtain timing information from the time delay utilized by the example auto hold analyzer circuitry 202. For example, the timer control circuitry 204 initiates the time delay in response to the brake pedal 116 being pressed by a driver or user of the vehicle 100. Additionally or alternatively, the example timer control circuitry 204 analyzes and/or determines whether the time delay has elapsed. In some examples, the aforementioned time delay will cause a delay for a variable period of time based on a condition, location, user-preferences, user accessibility settings, etc. In some examples, the timer control circuitry 204 is instantiated by processor circuitry executing timer control circuitry instructions and/or configured to perform operations such as those represented by the flowcharts of FIGS. 5 and 6.

In some examples, the driver input analyzer circuitry 206 is implemented to determine and/or analyze driver and/or user (e.g., passenger) input. For example, the driver input analyzer circuitry 206 determines a condition that the driver and/or user selected to control a duration of the time delay. Additionally or alternatively, the driver input analyzer circuitry 206 can be utilized to determine whether the brake pedal 116 has been pressed and/or pushed by the driver of the vehicle 100. In some such examples, the driver input analyzer circuitry 206 sends signals, based on the brake pedal 116 being pressed, to cause the timer control circuitry 204 to initiate the time delay. Additionally or alternatively, the example driver input analyzer circuitry 206 analyzes and/or determines whether a gas pedal has been pressed. For example, after the second indication has been displayed, the driver input analyzer circuitry 206 will analyze and/or determine whether the gas pedal in the vehicle 100 has been pressed, thereby triggering the auto hold controller 110 to disengage the auto hold system 107. In some examples, the driver input analyzer 206 is instantiated by processor circuitry executing driver input analyzer circuitry instructions and/or configured to perform operations such as those represented by the flowcharts of FIGS. 5 and 6.

In some examples, the condition analyzer circuitry 208 is implemented to determine and/or analyze a condition associated with the vehicle 100. For example, the condition analyzer circuitry 208 can be implemented to analyze a variety of conditions/parameters, such as, but not limited to, the location of the vehicle 100, weather patterns proximate the vehicle 100, a physiological condition of the driver, accessibility settings of the driver, traffic conditions, a biometric measurement of the driver, and/or the like. In some examples, the condition analyzer circuitry 208 is instantiated by processor circuitry executing condition analyzer circuitry instructions and/or configured to perform operations such as those represented by the flowcharts of FIGS. 5 and 6.

Figure 3A:
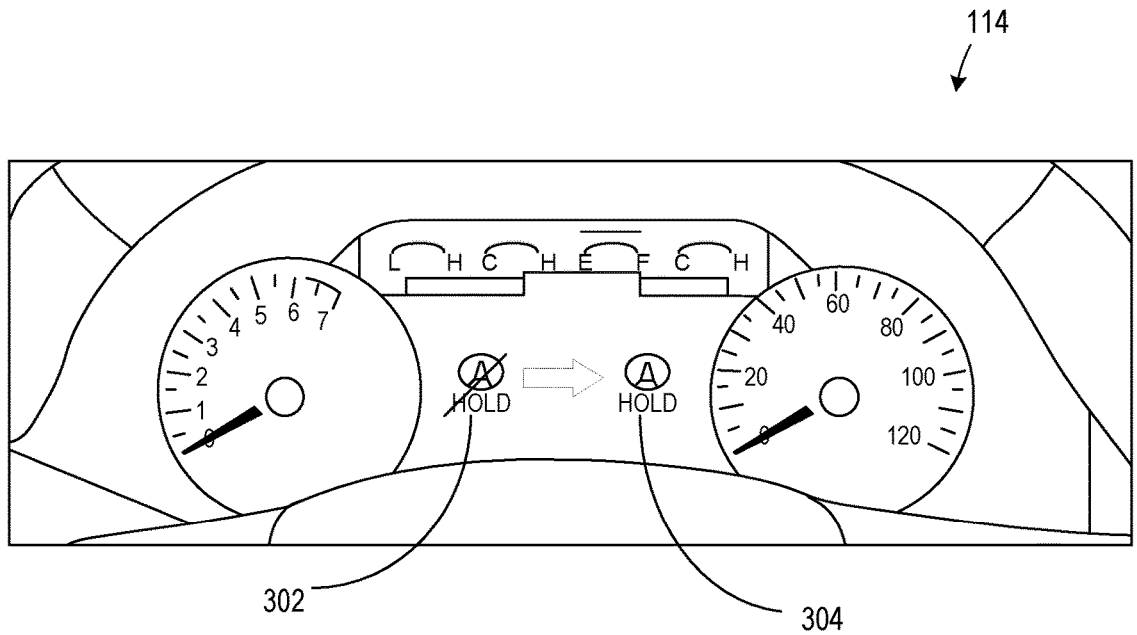
FIGS. 3A and 3B depict indications that can be implemented in examples disclosed herein.
Figure 3B:
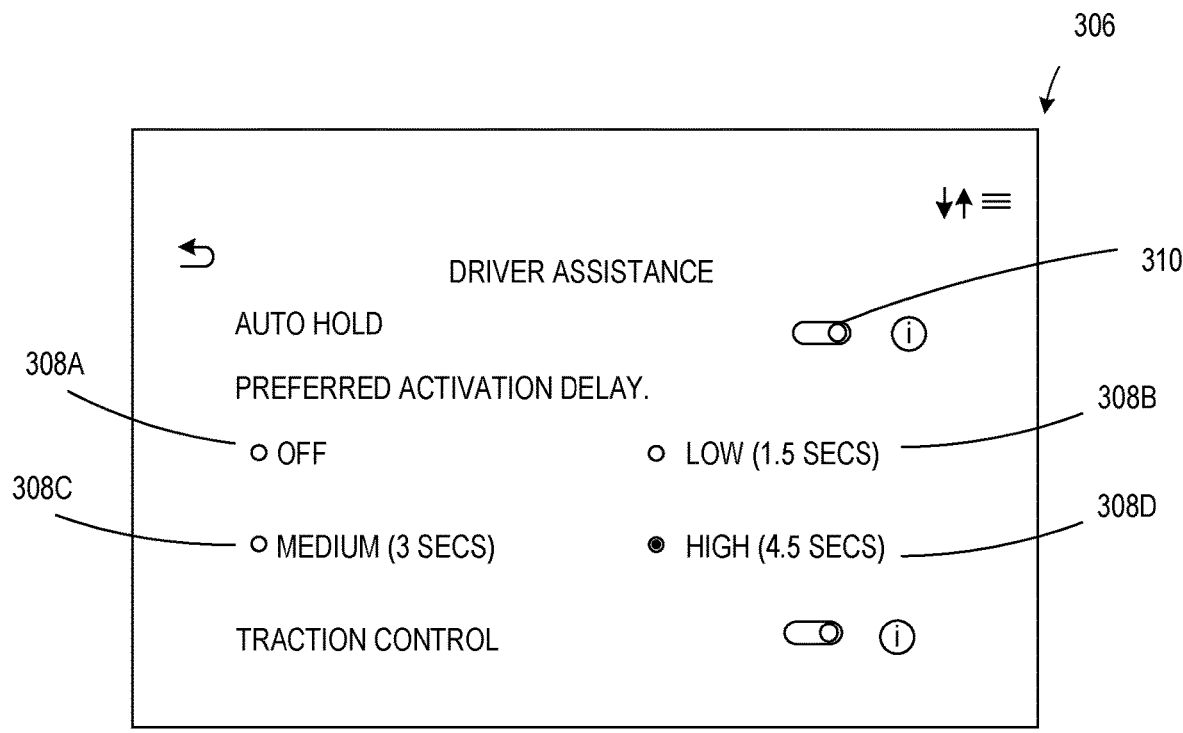

FIGS. 3A and 3B depict indications that can be implemented in examples disclosed herein. Turning to FIG. 3A, a detailed view of the example dashboard 114 of the vehicle 100 is depicted. The dashboard 114 of the illustrated example can indicate a multitude of vehicle information and/or parameters to the driver. For example, the dashboard 114 can indicate a speed of the vehicle 100, revolutions per minute (RPM) of an engine of the vehicle 100, gear selection, time, outside temperature, and the like. Additionally or alternatively, the dashboard 114 has an auto hold indicator 302, indicating that the auto hold system 107 is active (e.g., ready to be engaged), but not engaged. The dashboard 114 also includes an auto hold indicator 304 indicating that the auto hold feature is active and engaged.

In the example shown in FIG. 3A, the auto hold indicator 302 is displayed (e.g., illuminated) on the dashboard as a depicted letter "A" with a slash indicating that the auto hold system 107 has not been engaged (but is active). During this time period, the brake pressure will not be maintained by the auto hold controller 110. In contrast, when the auto hold system 107 has been engaged, the brake pressure will be maintained without the brake pedal 116 being pressed and the auto hold indicator 304 will be displayed.

FIG. 3B depicts an example auto hold setting selection interface 306 that can be displayed on the example dashboard 114 (e.g., an infotainment interface on or proximate the dashboard 114) of FIGS. 1 and 3A. The example auto hold setting selection interface 306 enables the driver of the vehicle 100 to select an auto hold setting and/or parameters of the auto hold system 107. For example, as shown in the example of FIG. 3B, the auto hold setting can be a duration of the delay timer settings 308A, 308B, 308C, 308D such that the driver can select or input a time delay for which the auto hold system 107 becomes engaged from when the driver initially presses the brake pedal 116. Further, in some such examples, the driver selects time delay options for the delay timer settings 308A, 308B, 308C, 308D with pre-set durations (e.g., "High," "Low," and "Medium" times that are selectable). In some example, the driver of the vehicle 100 may select a 0 second delay timer 308A, a 1.5 second delay timer 308B, a 3 second delay timer 308C, or a 4.5 second delay timer 308D. In other examples, the driver can input a specific time (e.g., a defined duration of minutes, seconds, etc.). Additionally or alternatively, the auto hold setting selection interface 306 includes a button or toggle 310 that can be implemented to toggle the auto hold controller 110 on and off. While the example auto hold setting selection interface 306 is shown as a touchscreen user interface, the example auto hold setting selection interface 306 can, alternatively, be any other type of interface such as, for example, an array of physical buttons positioned on any portion of the vehicle 100.

Figure 4A:
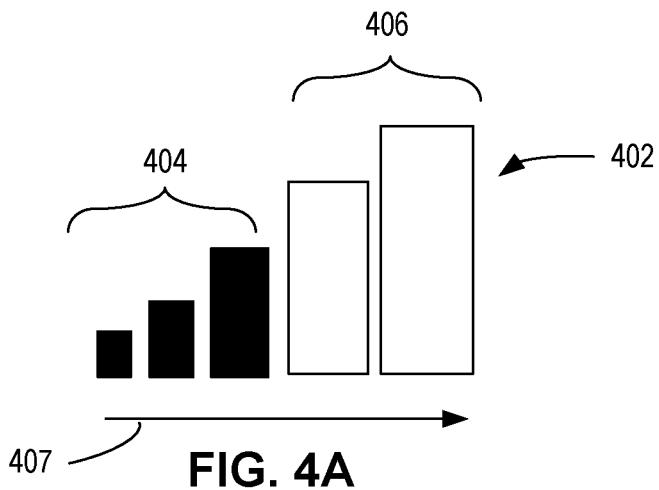
FIGS. 4A-4F depict alternate example indications that can be implemented in examples disclosed herein.

FIGS. 4A-4F are alternative example indications that can be implemented in examples disclosed herein. FIG. 4A depicts an example bar chart time indicator 402 such that shaded region(s) 404 indicate an amount of the time elapsed before the auto hold system 107 becomes engaged while the auto hold system 107 is active. Conversely, unshaded region(s) 406 depict an amount of time remaining before the auto hold system 107 becomes engaged. In this example, the shaded region(s) 404 extends in a direction generally indicated by an arrow 407 as the timer elapses. Alternatively, the shaded region(s) 404 become unshaded in a direction from right to left generally (in the view of FIG. 4A) as the timer elapses. In some examples, at least a portion of the bar chart time indicator 402 blinks when the auto hold system 107 is engaged.

Figure 4B:
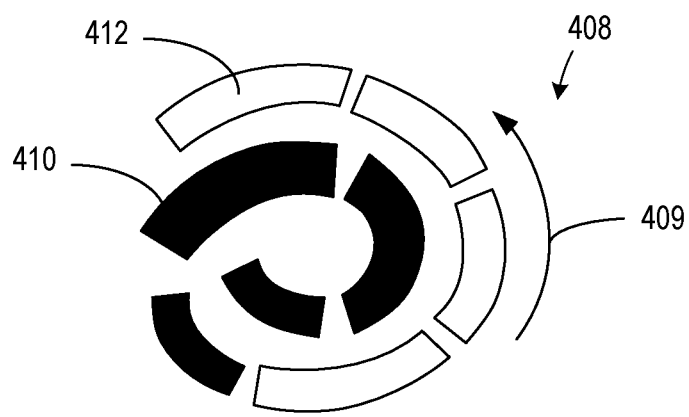

FIG. 4B depicts another example auto hold indicator 408 that is generally a spiral and/or ring-like in shape. In this example, shaded region(s) 410 represent a time delay such that unshaded region(s) 412 become shaded in a counter-clockwise direction generally indicated by an arrow 409. The auto hold indicator 408 may also indicate that the auto hold system 107 is to become engaged by having the shaded region(s) 410 move in a clockwise direction (in a direction opposite the arrow).

Figure 4C:
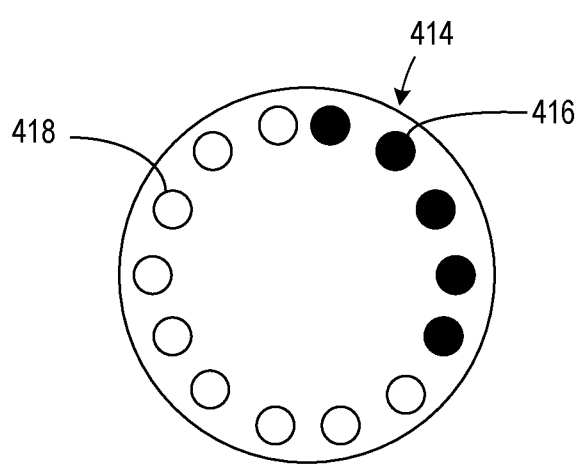

FIG. 4C depicts yet another example auto hold indicator 414 with a ring-like shape. The example auto hold indicator 414, as shown, includes unshaded region(s) 418, that become shaded region(s) 416. In this example, when all of the unshaded region(s) 418 become the shaded region(s) 416, the driver of the vehicle 100 is informed that the auto hold system 107 is engaged in addition to being active. In other examples, the auto hold indicator 414 may indicate that the auto hold system 107 is engaged and the auto hold system 107 is active by the shaded region(s) 416 becoming the unshaded region(s) 418.

Figure 4D:

FIG. 4D is another alternative example auto hold indicator 420. The example auto hold indicator 420 includes a countdown timer 422 that indicates an amount of time left before the auto hold system 107 engages (while the auto hold system 107 is active).

Figure 4E:
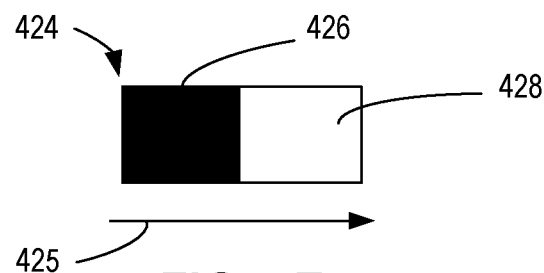

FIG. 4E is another alternative example auto hold indicator 424. In this example, the auto hold indicator 424 may be displayed as a time bar where a shaded region 426 moves/shifts from left to right (in view of FIG. 4E) as an unshaded region 428 is reduced, as generally indicated by an arrow 425. In some examples, the shaded region 426 decreases as the timer of the auto hold system 107 elapses.

Figure 4F:
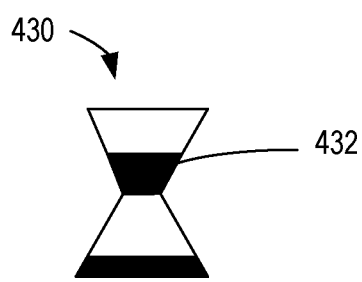

FIG. 4F is another alternative example auto hold indicator 430. The auto hold indicator 430, as shown, is in the form of a virtual hourglass. The shaded region(s) 432 represents the rate at which the delay timer 308A-D (or any set time delay) of the auto hold controller 110 has been set. Much like a conventional hourglass, upon the shaded region(s) 432 being fully contained in the lower portion of the virtual hourglass, the driver of the vehicle 100 will be alerted that the auto hold system 107 is engaged while the auto hold system 107 is active.

Any of the examples shown in FIGS. 3A-4F can be combined with one another. For example, any features of such can be combined with other features.

While an example manner of implementing the auto hold controller 110 of FIG. 1 is illustrated in FIG. 2, one or more of the elements, processes, and/or devices illustrated in FIG. 2 may be combined, divided, re-arranged, omitted, eliminated, and/or implemented in any other way. Further, the example auto hold status analyzer circuitry 202, the example timer control circuitry 204, the example driver input analyzer circuitry 206, the example condition analyzer circuitry 208 and/or, more generally, the example auto hold controller 110 of FIG. 1, may be implemented by hardware alone or by hardware in combination with software and/or firmware. Thus, for example, any of the example auto hold status analyzer circuitry 202, the example timer control circuitry 204, the example driver input analyzer circuitry 206, the example condition analyzer circuitry 208 and/or, more generally, the example auto hold controller 110, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example auto hold controller 110 of FIG. 1 may include one or more elements, processes, and/or devices in addition to, or instead of, those illustrated in FIG. 2, and/or may include more than one of any or all of the illustrated elements, processes and devices.

Figure 5:
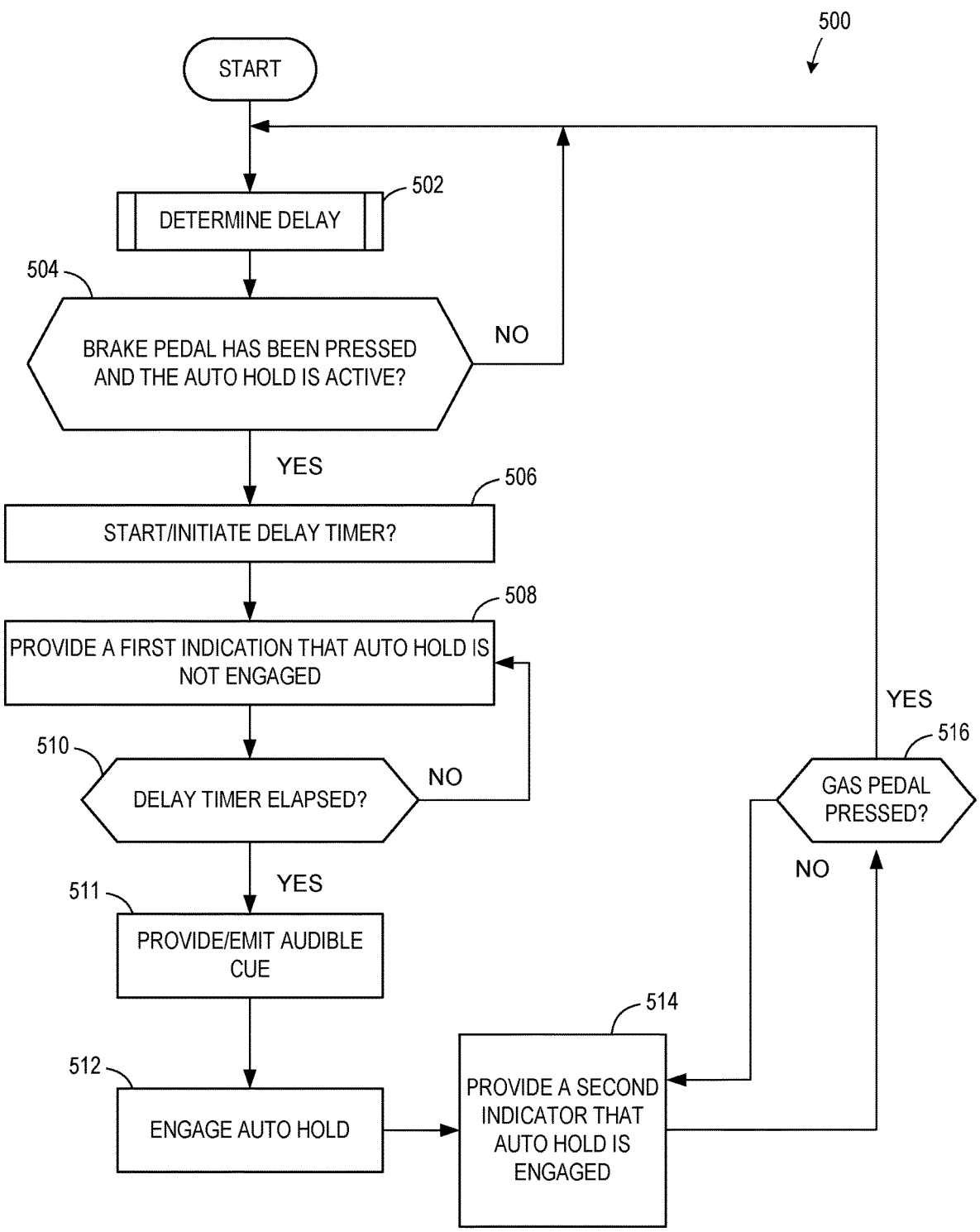
FIGS. 5 and 6 are flowcharts representative of example machine readable instructions that may be executed by example processor circuitry to implement the example auto hold controller of FIG. 2.
Figure 6:
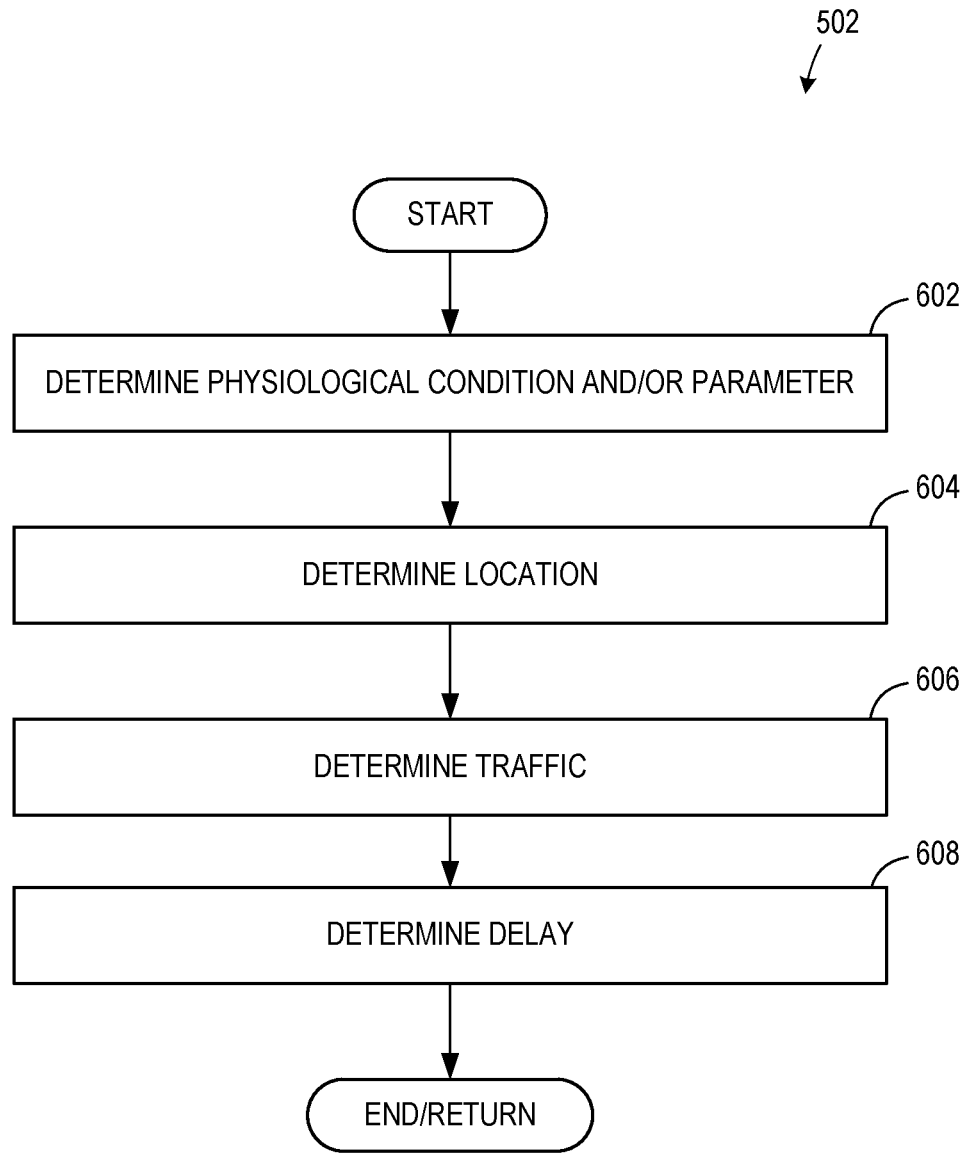

Flowcharts representative of example machine readable instructions, which may be executed to configure processor circuitry to implement the auto hold controller 110 of FIG. 2, are shown in FIGS. 5 and 6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 5 and 6, many other methods of implementing the example auto hold controller 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5 and 6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIGS. 5 and 6 are flowcharts representative of example machine readable instructions and/or example operations 500 that may be executed and/or instantiated by processor circuitry to provide indications when the auto hold system 107 is engaged or not engaged during a time delay. The machine readable instructions and/or the operations 500 of FIG. 5 begin as the driver input analyzer circuitry 206 and/or the condition analyzer circuitry 208 receives and/or determines a presence of driver or user input (e.g., via a selection panel). In some examples, as described in greater detail below in connection with FIG. 6, at block 502, the driver input analyzer circuitry 206 determines a duration of a time delay related to engaging the auto hold system 107 (subsequent to the driver pressing the brake pedal 116) while the auto hold system 107 is active.

At block 504, the auto hold status analyzer circuitry 202 and/or the driver input analyzer circuitry 206 determines whether the brake pedal 116 has been pressed and that the auto hold system 107 is active and/or initiated. If the brake pedal 116 has been pressed, control of the process proceeds to block 506. Otherwise, the process returns to block 502. For example, the auto hold status analyzer circuitry 202 and/or the driver input analyzer circuitry 206 utilizes sensors to determine whether the brake pedal 116 has been pressed. In particular, the driver input analyzer circuitry 206 can utilize data from a pressure sensor to determine whether the brake pedal 116 has been pressed.

At block 506, the timer control circuitry 204 initiates and/or starts a time delay for the auto hold system 107. In some examples, the time delay is initiated by the timer control circuitry 204 when the driver input analyzer circuitry 206 determines that the brake pedal 116 has been pressed.

At block 508, in the illustrated example of FIG. 5, the auto hold status analyzer circuitry 202 provides a first indication that an auto hold system 107 is not engaged. For example, subsequent to the driver input analyzer circuitry 206 determining that the brake pedal 116 has been pressed and the timer control circuitry 204 starting a time delay, the auto hold status analyzer circuitry 202 will cause a display of the vehicle 100 to provide the first indication, which indicates to the driver of the vehicle 100 that the auto hold system 107 has not yet been engaged (while the auto hold system 107 is active). In some examples, the first indication may be displayed via the dashboard 114 and may be any of the previously mentioned example indicators shown in FIGS. 3A and 4A-4F, or any combination thereof. Additionally or alternatively, the first indicator may include a sound or other audible cue through an audible device (e.g., a speaker) indicating that the auto hold system 107 has not yet been engaged.

At block 510, in some examples, the timer control circuitry 204 determines whether the aforementioned time delay has elapsed. If the time delay has elapsed (block 510), control of the process proceeds to block 512. Otherwise, the process returns to block 508.

At block 511, in some examples, the auto hold status analyzer circuitry 202 may cause a device (e.g., a speaker) to provide/emit an audible cue indicating that the auto hold system 107 is active and has been engaged. The audible cue may be one or more sounds (e.g., a repetitive beeping sound, a musical tone, etc.). The audible device may be any audible device implemented in the vehicle 100 (e.g., an audio speaker for listening to music, etc.).

At block 512, the example auto hold status analyzer circuitry 202 engages the auto hold system 107 upon the time delay elapsing. The auto hold system 107 may be an auto hold braking system or an auto hold throttling system. To this end, the example auto hold controller 110 is communicatively coupled to the auto hold system 107 via the brake controller 112.

At block 514, the auto hold status analyzer circuitry 202 provides a second indicator that indicates that the auto hold system 107 is engaged when the time delay elapses. In some examples, the second indication may be displayed via the dashboard 114 with any of the previously mentioned indicators shown in FIGS. 3A and 4A-4F, or any combination thereof. Additionally or alternatively, the second indicator may include or be accompanied by an audible sound indicating that the auto hold system 107 has been engaged.

At block 516, the driver input analyzer circuitry 206 determines whether a gas pedal of the example vehicle 100 is pressed (e.g., remains pressed) by the driver. If the gas pedal is pressed (block 516), control of the processes of FIG. 5 return to block 502. Otherwise, the process returns to block 514.

FIG. 6 is a flowchart representative of an example subroutine 502 of FIG. 5. In the illustrated example, a duration of the time delay is defined by the driver or user of the example vehicle 100. Additionally or alternatively, the duration of the time delay is set and/or calculated based on conditions associated with the vehicle 100 and/or parameter(s) of the driver of the vehicle 100. In some examples, the driver or user may select and/or input the condition for use in determining the time delay via a selection panel displayed on the example dashboard 114.

At block 602, in some examples, the driver input analyzer circuitry 206 determines a driver physiological condition/parameter and/or a user-selected parameter. For example, the physiological condition may be a biometric measurement pertaining to pressing the brake pedal 116 (e.g., leg displacement and/or movement range corresponding to pressing the brake pedal 116). Additionally or alternatively, the user accessibility settings are utilized to set and/or calculate the time delay.

At block 604, in some examples, the location of the example vehicle 100 is determined by the condition analyzer circuitry 208. In some such examples, a time delay is selected based on the location of the example vehicle 100. For example, if the location of the vehicle 100 is determined to be in a parking lot, the duration of the time delay may be set at a higher duration to prevent an unintended or undesired use of the auto hold system 107.

At block 606, in some examples, the condition analyzer circuitry 208 determines and/or calculates the time delay duration based on traffic conditions (e.g., traffic conditions on a route of the vehicle 100). For example, in the event of stop-and-go traffic, it may be desired for the auto hold system 107 to activate more often and, thus, a shorter duration can be utilized for the auto hold system 107 to engage. Further, in some such examples, the condition analyzer circuitry 208 may adapt parameters of the auto hold system 107, such as a time delay, through machine learning, for example, to improve a driving experience of the driver or user.

At block 608, in some examples, the driver input analyzer circuitry 206 determines the duration of the time delay based on a combination of any of the aspects of blocks 602-606 and the process ends/returns. Additionally or alternatively, the condition analyzer circuitry 208 and/or the driver input analyzer circuitry 206 determines the duration of the time delay based on the driver defining or selecting a time delay duration value. In some examples, different conditions and/or parameters are weighted to set the duration of the time delay.

Figure 7:
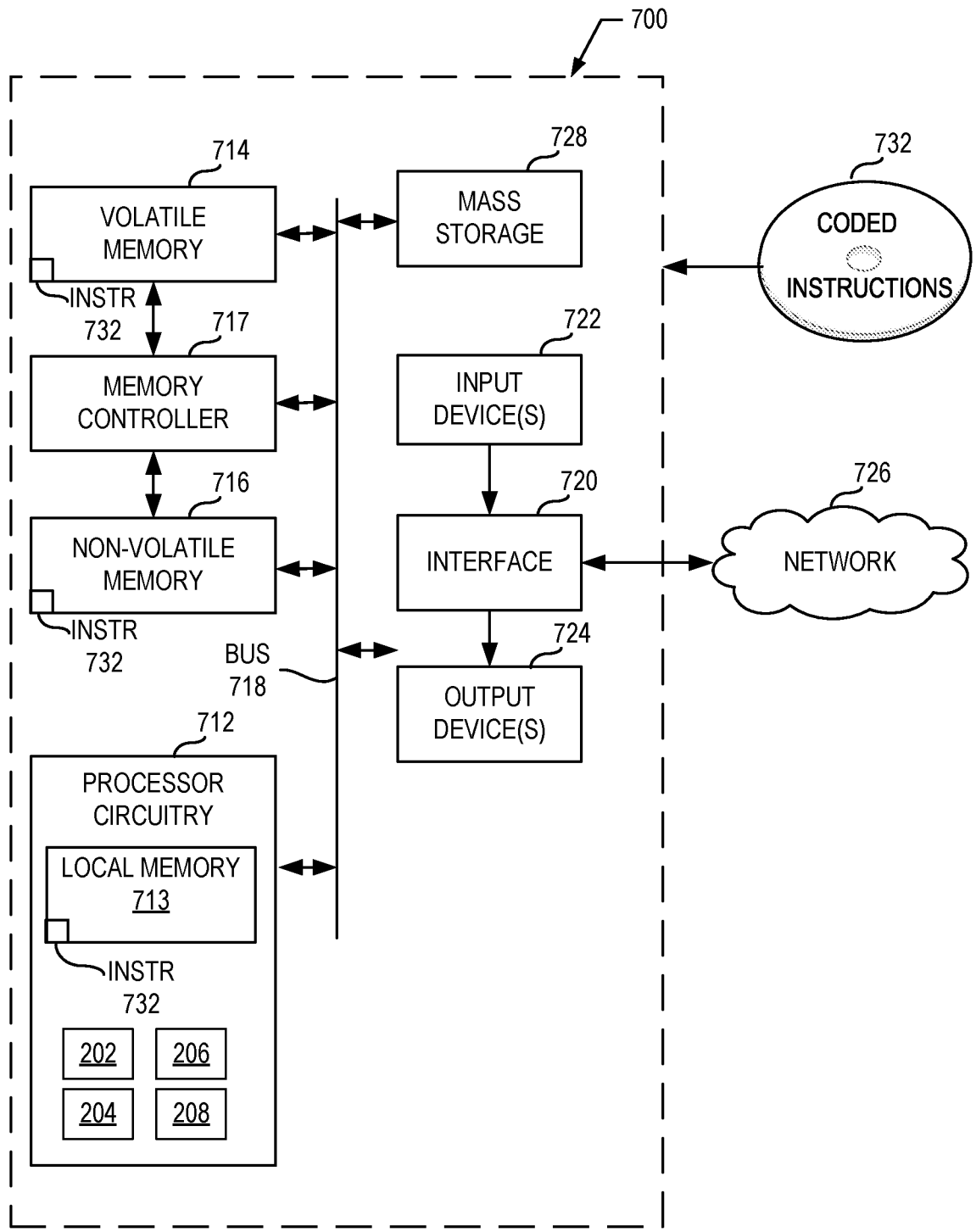
FIG. 7 is a block diagram of an example processing platform including processor circuitry structured to execute the example machine readable instructions and/or the example operations of FIGS. 5 and 6 to implement the auto hold controller of FIG. 2.

FIG. 7 is a block diagram of an example processor platform 700 structured to execute and/or instantiate the machine readable instructions and/or the operations of FIGS. 5 and 6 to implement the auto hold controller 110 of FIG. 2. The processor platform 700 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example auto hold status analyzer circuitry 202, example timer control circuitry 204, example driver input analyzer circuitry 206 and example condition analyzer circuitry 208.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 732, which may be implemented by the machine readable instructions of FIGS. 5 and 6, may be stored in the mass storage device 728, in the volatile memory 714, in the non-volatile memory 716, and/or on a removable non-transitory computer readable storage medium such as a CD or DVD.

Figure 8:
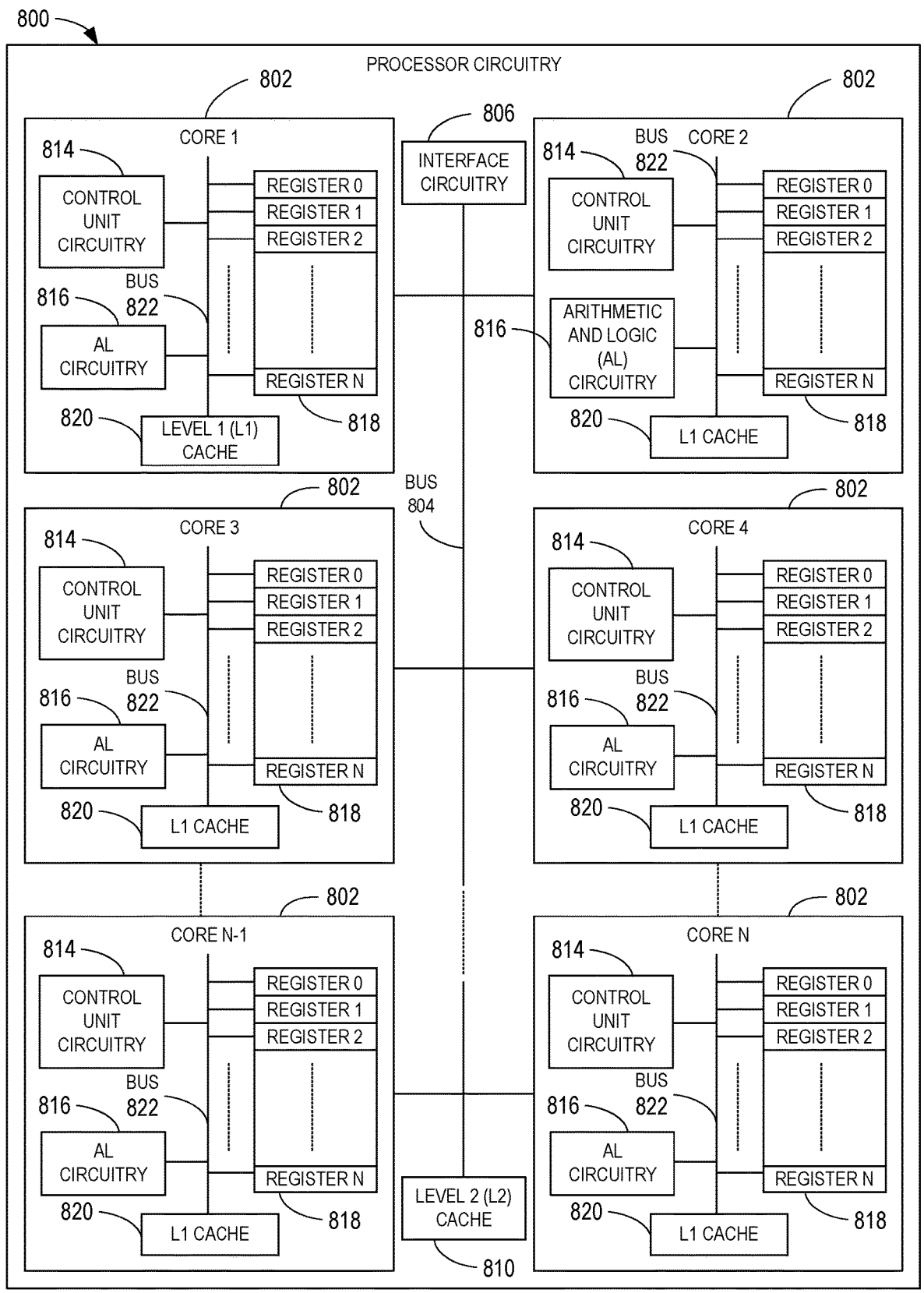
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may be a general purpose microprocessor (e.g., general purpose microprocessor circuitry). The microprocessor 800 executes some or all of the machine readable instructions of the flowcharts of FIGS. 5 and 6 to effectively instantiate the circuitry of FIG. 2 as logic circuits to perform the operations corresponding to those machine readable instructions. In some such examples, the circuitry of FIG. 2 is instantiated by the hardware circuits of the microprocessor 800 in combination with the instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 5 and 6.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 7. Alternatively, the registers 818 may be organized in any other arrangement, format, or structure including distributed throughout the core 802 to shorten access time. The second bus 822 may be implemented by at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
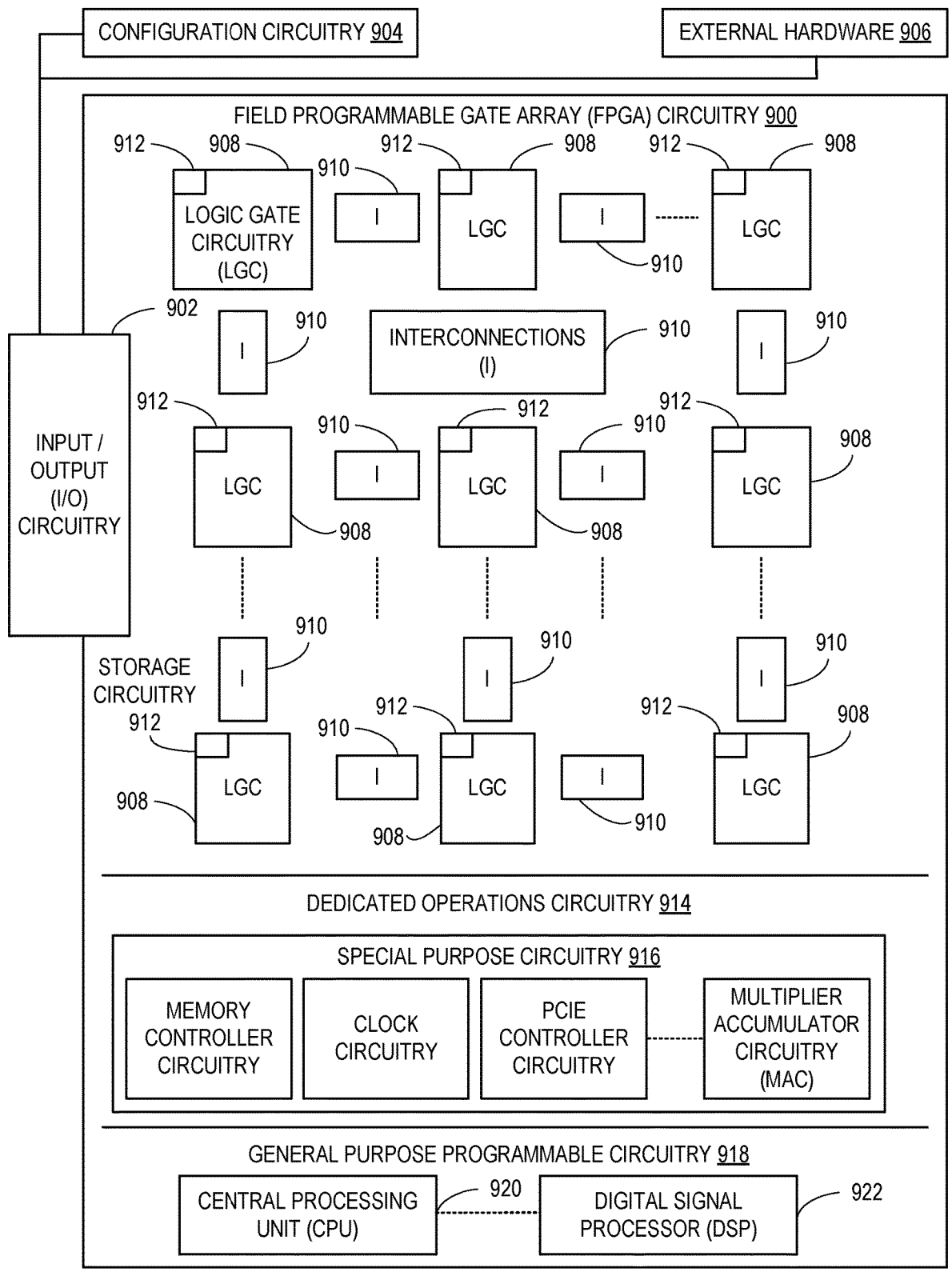
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 5 and 6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 5 and 6. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 5 and 6. As such, the FPGA circuitry 900 may be structured to effectively instantiate some or all of the machine readable instructions of the flowcharts of FIGS. 5 and 6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 5 and 6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may be implemented by external hardware circuitry. For example, the external hardware 906 may be implemented by the microprocessor 800 of FIG. 8. The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations that may correspond to at least some of the machine readable instructions of FIGS. 5 and 6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 5 and 6 may be executed by one or more of the cores 802 of FIG. 8, a second portion of the machine readable instructions represented by the flowcharts of FIGS. 5 and 6 may be executed by the FPGA circuitry 900 of FIG. 9, and/or a third portion of the machine readable instructions represented by the flowcharts of FIGS. 5 and 6 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Example methods, apparatus, systems, and articles of manufacture to enable a drive and/or user of a vehicle to be informed of a status of a vehicle auto hold system are disclosed herein. Further examples and combinations thereof include the following:

Example 1 includes an apparatus comprising at least one memory, instructions, and processor circuitry to execute the instructions to determine that an automated vehicle hold system is active, based on the determination that the automated vehicle hold system is active, initiate a delay timer, prior to the delay timer elapsing, provide a first indication corresponding to the automated vehicle hold system not being engaged, and upon the delay timer elapsing, provide a second indication corresponding to the automated vehicle hold system being engaged.

Example 2 includes the apparatus as defined in example 1, wherein the first indication includes a countdown timer associated with the delay timer.

Example 3 includes the apparatus as defined in any of examples 1 or 2, wherein the first indication includes a graphical representation of time.

Example 4 includes the apparatus as define in example 3, wherein the graphical representation of time includes a bar chart indicator.

Example 5 includes the apparatus as defined in example 3, wherein the graphical representation of time includes a ring-like shape indicator.

Example 6 includes the apparatus as defined in any of examples 1 to 5, wherein the processor circuitry is to execute the instructions to cause an audible device to emit an audible cue when the second indication is displayed.

Example 7 includes the apparatus as defined in any of examples 1 to 6, wherein the processor circuitry is to execute the instructions to set a duration of the delay timer based on a condition of a vehicle supporting the automated vehicle hold system.

Example 8 includes the apparatus as defined in any of examples 1 to 7, wherein the processor circuitry is to execute the instructions to set a duration of the delay timer based on traffic proximate a vehicle supporting the automated vehicle hold system.

Example 9 includes a method comprising determining, by executing instructions with at least one processor, that an automated vehicle hold system is initiated and that a brake is engaged, based on the determination that the automated vehicle hold system is initiated and the brake being engaged, starting, by executing instructions with the at least one processor, a delay timer, prior to the delay timer elapsing, providing, by executing instructions with the at least one processor, a first indication corresponding to the automated vehicle hold system not being engaged, and upon the delay timer elapsing, by executing instructions with the at least one processor, providing a second indication corresponding to the automated vehicle hold system being engaged.

Example 10 includes the method as defined in example 9, wherein a duration of the delay timer is selected by a user.

Example 11 includes the method as defined in any of examples 9 or 10, further including accessing or receiving, by executing instructions with the at least one processor, a duration associated with the delay timer via a user interface, and setting, by executing instructions with the at least one processor, the delay timer to the duration.

Example 12 includes the method as defined in any of examples 9 to 11, wherein the first indication includes a graphical representation of a duration of the delay timer.

Example 13 includes the method as defined in any of examples 9 to 12, further including providing, by executing instructions with the at least one processor, an audible cue when the second indicator is provided.

Example 14 includes the method as defined in any of examples 9 to 13, further including setting, by executing instructions with the at least one processor, a duration associated with the delay timer based on a condition of a vehicle supporting the automated vehicle hold system.

Example 15 includes the method as defined in any of examples 9 to 14, wherein the at least one processor executes instructions to set a duration associated with the delay timer based on traffic surrounding a vehicle supporting the automated vehicle hold system.

Example 16 includes a non-transitory machine readable storage medium comprising instructions that, when executed, cause processor circuitry to at least determine that an automated vehicle hold system is initiated, start a delay timer based on the determination that the automated vehicle hold system is initiated, prior to the delay timer elapsing, provide a first indication corresponding to the automated vehicle hold system not being engaged, and upon the delay timer elapsing, cause the automated vehicle hold system to be engaged and provide a second indication corresponding to the automated vehicle hold system being engaged.

Example 17 includes the non-transitory machine readable storage medium as defined in example 16, wherein the first indication includes a countdown timer associated with the delay timer.

Example 18 includes the non-transitory machine readable storage medium as defined in any of examples 16 or 17, wherein the first indication includes a graphical representation of time.

Example 19 includes the non-transitory machine readable storage medium as defined in any of examples 16 to 18, wherein the instructions cause the processor circuitry to enable an audible device to emit an audible cue when the second indicator is displayed.

Example 20 includes the non-transitory machine readable storage medium as defined in an of examples 16 to 19, wherein the instructions cause the processor circuitry to set a duration of the delay timer based on a condition of a vehicle supporting the automated vehicle hold system.

From the foregoing, it will be appreciated that example systems, methods, apparatus, and articles of manufacture have been disclosed that advantageously clearly display an indication to the driver or user of a vehicle whether auto hold is engaged or not engaged during a time delay. Examples disclosed herein can advantageously provide the user or driver of the vehicle the ability to customize the time delay for particular scenarios. Further, examples disclosed herein enable adaptable (e.g., substantially in real-time) adjustment of a time delay.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   at least one memory;
   instructions stored in the at least one memory; and
   processor circuitry to execute the instructions to:
   determine that an automated vehicle hold system is active;
   based on the determination that the automated vehicle hold system is active, initiate a delay timer;
   prior to the delay timer elapsing, provide a first indication corresponding to the automated vehicle hold system not being engaged, the first indication indicating an amount of time remaining between when the automated vehicle hold system is not engaged to when the automated vehicle hold system is to be engaged; and
   upon the delay timer elapsing, provide a second indication corresponding to the automated vehicle hold system being engaged.

2. The apparatus as defined in claim 1, wherein the first indication includes a countdown timer associated with the amount of time remaining.

3. The apparatus as defined in claim 1, wherein the first indication includes a graphical representation of the time remaining between when the automated vehicle hold system is not engaged to when the automated vehicle hold system is engaged.

4. The apparatus as defined in claim 3, wherein the graphical representation of the time remaining includes a bar chart indicator for indicating a point in time between the automated vehicle hold system not being engaged to the automated vehicle hold system being engaged.

5. The apparatus as defined in claim 3, wherein the graphical representation of time includes a ring-like shape indicator for indicating a point in time between the automated vehicle hold system not being engaged to the automated vehicle hold system being engaged.

6. The apparatus as defined in claim 1, wherein the processor circuitry is to execute the instructions to cause an audible device to emit an audible cue when the second indication is displayed.

7. The apparatus as defined in claim 1, wherein the processor circuitry is to execute the instructions to set a duration of the delay timer based on a condition of a vehicle supporting the automated vehicle hold system.

8. The apparatus as defined in claim 1, wherein the processor circuitry is to execute the instructions to set a duration of the delay timer based on traffic proximate a vehicle supporting the automated vehicle hold system.

9. A method comprising:
determining, by executing instructions with at least one processor, that an automated vehicle hold system is initiated and that a brake is engaged;
based on the determination that the automated vehicle hold system is initiated and the brake being engaged, starting, by executing instructions with the at least one processor, a delay timer;
prior to the delay timer elapsing, providing, by executing instructions with the at least one processor, a first indication corresponding to the automated vehicle hold system not being engaged, the first indication indicating an amount of time remaining between when the automated vehicle hold system is not engaged to when the automated vehicle hold system is to be engaged; and
upon the delay timer elapsing, by executing instructions with the at least one processor, providing a second indication corresponding to the automated vehicle hold system being engaged.

10. The method as defined in claim 9, wherein a duration of the delay timer is selected by a user.

11. The method as defined in claim 9, further including:
accessing or receiving, by executing instructions with the at least one processor, a duration associated with the delay timer via a user interface; and
setting, by executing instructions with the at least one processor, the delay timer to the duration.

12. The method as defined in claim 9, wherein the first indication includes a graphical representation of a duration of the delay timer.

13. The method as defined in claim 9, further including providing, by executing instructions with the at least one processor, an audible cue when the second indicator is provided.

14. The method as defined in claim 9, further including setting, by executing instructions with the at least one processor, a duration associated with the delay timer based on a condition of a vehicle supporting the automated vehicle hold system.

15. The method as defined in claim 9, further including setting, by executing instructions with the at least one processor, a duration associated with the delay timer based on traffic surrounding a vehicle supporting the automated vehicle hold system.

16. A non-transitory machine readable storage medium comprising instructions that, when executed, cause processor circuitry to at least:
determine that an automated vehicle hold system is initiated;
start a delay timer based on the determination that the automated vehicle hold system is initiated;
prior to the delay timer elapsing, provide a first indication corresponding to the automated vehicle hold system not being engaged, the first indication including a display of an amount of time remaining between when the automated vehicle hold system is not engaged to when the automated vehicle hold system is to be engaged; and
upon the delay timer elapsing, cause the automated vehicle hold system to be engaged and provide a second indication corresponding to the automated vehicle hold system being engaged.

17. The non-transitory machine readable storage medium as defined in claim 16, wherein the first indication includes a countdown timer associated with the delay timer.

18. The non-transitory machine readable storage medium as defined in claim 16, wherein the first indication includes a graphical representation of the amount of time remaining.

19. The non-transitory machine readable storage medium as defined in claim 16, wherein the instructions cause the processor circuitry to enable an audible device to emit an audible cue when the second indicator is displayed.

20. The non-transitory machine readable storage medium as defined in claim 16, wherein the instructions cause the processor circuitry to set a duration of the delay timer based on a condition of a vehicle supporting the automated vehicle hold system.

21. The apparatus as defined in claim 1, wherein the first indication is a display of the amount of time remaining.

* * * * *